United States Patent
Carney

(10) Patent No.: US 8,531,964 B2
(45) Date of Patent: Sep. 10, 2013

(54) DATA UNIT INFORMATION TRANSFORMATION

(75) Inventor: John C. Carney, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/299,960

(22) Filed: Nov. 18, 2011

(65) Prior Publication Data

US 2012/0063467 A1 Mar. 15, 2012

Related U.S. Application Data

(63) Continuation of application No. 11/329,179, filed on Jan. 11, 2006, now Pat. No. 8,081,572.

(51) Int. Cl.
*H04L 12/26* (2006.01)

(52) U.S. Cl.
USPC .......................................... 370/236

(58) Field of Classification Search
USPC ................. 370/229–231, 235, 236, 241, 252, 370/351, 389, 392, 395.1, 400, 428, 901, 370/902, 912, 914
See application file for complete search history.

(56) References Cited

U.S. PATENT DOCUMENTS

| | | | |
|---|---|---|---|
| 6,810,039 B1 | 10/2004 | Parruck et al. | |
| 2001/0005383 A1 | 6/2001 | Yoshimoto et al. | |
| 2002/0085507 A1 | 7/2002 | Ku et al. | |
| 2002/0101863 A1* | 8/2002 | Endo | 370/356 |
| 2003/0193939 A1 | 10/2003 | Henrion | |
| 2003/0193956 A1 | 10/2003 | Dietrich | |
| 2004/0100944 A1 | 5/2004 | Richmond et al. | |
| 2004/0114589 A1* | 6/2004 | Alfieri et al. | 370/389 |
| 2004/0218596 A1 | 11/2004 | Tagore-Brage et al. | |
| 2005/0286555 A1 | 12/2005 | Hayashi | |
| 2006/0182024 A1 | 8/2006 | Zhao et al. | |
| 2006/0250965 A1 | 11/2006 | Irwin | |
| 2007/0058539 A1 | 3/2007 | Bordonaro et al. | |
| 2007/0276973 A1 | 11/2007 | Tan et al. | |

FOREIGN PATENT DOCUMENTS

EP 1229692 A1 8/2002

OTHER PUBLICATIONS

Co-pending U.S. Appl. No. 11/329,179, filed Jan. 11, 2006 entitled "Hierarchical Packet Scheduling" by John C. Carney, 45 pages.
Leon-Garcia et al., "Communication Networks Fundamental Concepts and Key Architectures," 2003, McGraw-Hill, Second Edition, pp. 674-688.

* cited by examiner

*Primary Examiner* — Omar Ghowrwal
(74) *Attorney, Agent, or Firm* — Harrity & Harrity, LLP

(57) ABSTRACT

A packet scheduler may include logic configured to receive packet information. The packet scheduler may include logic to receive an operating parameter associated with a downstream device that operates with cell-based traffic. The packet scheduler may include logic perform a packet to cell transformation to produce an output based on the operating parameter. The packet scheduler may include logic to use the output to compensate for the downstream device.

20 Claims, 6 Drawing Sheets

| NODE IDENTIFIER 510 | | | |
|---|---|---|---|
| NODE N2 TRANSFORMATION FUNCTION 520 | | | |
| NODE N2 CONTROL FUNCTION 530 | | | |
| 540 UPSTREAM NODE FUNCTIONS | 550 DOWNSTREAM NODE FUNCTIONS | 560 SCHEDULER PARAMETERS | 570 OTHER PARAMETERS |
| N0 | N3 | S0 | |
| N1 | N4 | S1 | |
| | | S2 | |
| | | S3 | |
| | | S(N) | |

DATA UNIT INFORMATION TRANSFORMATION

RELATED APPLICATION

This application is a continuation of U.S. patent application Ser. No. 11/329,179 filed Jan. 11, 2006, now U.S. Pat. No. 8,081,572, which is incorporated herein by reference.

FIELD OF THE INVENTION

Implementations consistent with the principles of the invention relate generally to network communication and, more particularly, to techniques for scheduling packets in association with a packet scheduler.

BACKGROUND

Network devices, such as routers, may be used to transport traffic in networks. Network devices may include multiple processing stages to operate on incoming packets before sending the packets to a downstream device. For example, a network device may include a packet scheduler as one of the processing stages. The packet scheduler may be used to schedule the arrival and/or departure of packets at the network device.

SUMMARY

In accordance with an aspect, a device is provided. The device may include a scheduler to schedule packets. The scheduler may include a first node that has an associated first node transformation function. The scheduler may include a second node that operates on packet information using the first node transformation function to produce adjusted packet information that is used on behalf of a downstream device.

In accordance with another aspect, a packet scheduler is provided. The packet scheduler may include logic configured to receive packet information. The packet scheduler may include logic to receive an operating parameter associated with a downstream device that operates with cell-based traffic. The packet scheduler may include logic to perform a packet to cell transformation to produce an output based on the operating parameter. The packet scheduler may include logic to use the output to compensate for the downstream device.

In accordance with yet another aspect, a method for scheduling packets at a first node is provided. The method may include receiving packet information. The method may include receiving a node transformation function used by a second node to operate on the packet information. The method may include operating on the packet information using the node transformation function to produce adjusted packet information that is associated with a size or format of an adjusted packet that compensates for a characteristic of a downstream device. The method may include using the adjusted packet information to represent the adjusted packet that is sent to the downstream device or to another device.

In accordance with still another aspect, a method for accounting for packet to cell transformations in a packet scheduler is provided. The method may include receiving packet information and receiving an operating parameter used by a downstream device that operates on cell-based traffic. The method may include accounting for packet to cell transformation on behalf of the downstream device and using the operating parameter to produce an output that represents the packet to cell transformation. The method may include using the output to facilitate sending an output data unit to the downstream device.

In accordance with yet another aspect, a packet scheduling device operating in a network is provided. The device may include means for scheduling packets and means for receiving packet information from a scheduler node. The device may include means for receiving a scheduler node transformation function from the scheduler node. The device may include means for processing the packet information using the received transformation function to produce a result. The device may include means for using the result to compensate for characteristics of a downstream device.

In accordance with still another aspect, a network device is provided. The device may include a data unit scheduler that includes a first node that has an associated first node transformation function and a second node. The second node may include logic to represent a data unit transformed from a first format to a second format using transformed data unit information. The second node may include an interface adapted to receive the first node transformation function from the first node, receive data unit information, and use the transformed data unit information to facilitate sending a transformed data unit to a destination.

BRIEF DESCRIPTION OF THE DRAWINGS

The accompanying drawings, which are incorporated in and constitute a part of this specification, illustrate implementations of the invention and, together with the description, explain the invention. In the drawings.

FIG. 5 illustrates an exemplary data structure that can be used to store information associated with the node of FIG. 4 according to an implementation consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Exemplary implementations consistent with principles of the invention facilitate scheduling data units, such as packets, in a network. A memory may store data units and may pass data unit information, such a data unit size information, data unit priority information, data unit color information, etc., to a scheduler. The scheduler may operate on the data unit information and may pass processed information back to the memory. The processed information may be used to schedule data units in a network device.

A scheduler consistent with the principles of the invention, such as a hierarchical packet scheduler, may facilitate scheduling data units using a number of nodes arranged in a hierarchy. The nodes may be configured so that a node can inherit transformation functions from other nodes, where transformation functions are used by nodes to operate on data unit information passing through the scheduler. Exemplary implementations of schedulers described herein may also employ nodes that can be configured to accommodate packet to cell transformations. Packet to cell transformations may allow users to specify traffic rates in cells per second instead of packets per second when interacting with implementations of the invention.

A "data unit," as used herein, may refer to any type of machine-readable data having substantially any format that may be adapted for use in one or more networks, such as a public network and/or private network. A data unit may include packet data and/or non-packet data.

First Exemplary Implementation

Figure 1:
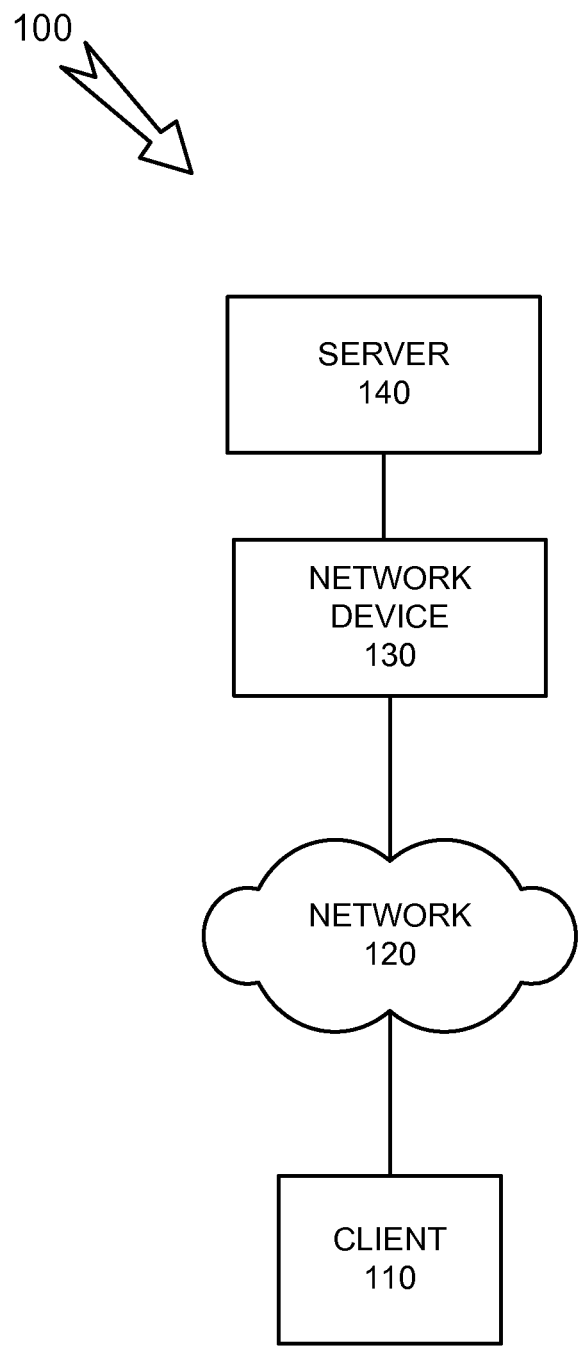
FIG. 1 is a diagram of an exemplary network in which systems and methods consistent with the principles of the invention may be implemented.

FIG. 1 is a diagram of an exemplary network 100 in which systems and methods consistent with the principles of the invention may be implemented. Network 100 may include, among other things, client 110, network 120, network device 130, and server 140. While network 100 is shown to include a particular number and arrangement of elements, network 100 may include fewer, more, different, or differently arranged elements in other implementations consistent with the principles of the invention. In addition, network 100 may include the illustrated elements, and other elements, in alternative configurations consistent with the principles of the invention. For example, network device 130 may be located between client 110 and network 120.

Client 110 may include a device configured to send a data unit to a network and/or to receive a data unit from a network. Client 110 may be associated with a person, such as a user. For example, client 110 may represent a subscriber of communication services provided by server 140. Client 110 may include a desktop computer, a laptop computer, a personal digital assistant (PDA), a web enabled cellular telephone, a wireless fidelity (Wi-Fi) device, or another type of application specific processing device that is operated by a user to communicate with a destination device, such as server 140. Client 110 may communicate with other devices, such as other clients, network device 130 and/or server 140, by sending, for example, a data unit, such as a packet.

Network 120 may include a network, or combination of networks, capable of transporting data units. For example, network 120 may include a local area network (LAN), a metropolitan network (MAN), or a wide area network (WAN), such as the Internet. Network 120 may include hardwired connections, such as shielded twisted pairs, coaxial cables, optical fibers, and/or waveguides. Alternatively, network 120 may include wireless links, such as free space optical links, and/or free space acoustic links. Network 120 may operate using substantially any protocol, such as asynchronous transfer mode (ATM), synchronous optical transport (Sonet), Internet Protocol (IP), public switched telephone network (PSTN), or Bluetooth.

Network device 130 may include a device capable of receiving a data unit via a network. In one implementation, network device 130 may include an in-line device operating as an edge device between a first network and a destination device that may be operating on a second network. For example, network device 130 may operate as an edge device between an untrusted network, such as the Internet, and a trusted network, such as a corporate LAN. "Inline network device" may refer to any network device operating in a manner whereby all, or substantially all, data units intended for a destination device pass through the network device before reaching the destination device. Network device 130 may include devices such as routers, gateways, firewalls, switches, and/or servers. For example, network device 130 may operate as a router in cooperation with server 140 to provide communication services to a number of subscribers, such as client 110. Network device 130 may perform operations, such as data unit scheduling and/or data unit conversion, when operating with the devices of network 100.

Server 140 may include a device capable of receiving a data unit from or transmitting a data unit to another device and/or network. For example, server 140 may include a workstation, desktop computer, laptop computer, PDA, web enabled cellular telephone, Wi-Fi device, or another type of device. In exemplary implementations described herein, server 140 may operate as a destination device by receiving one or more data units from client 110 via an intermediate device, such as network device 130. For example, server 140 may provide a service to other devices on network 100, such as client 110.

Client 110 may communicate with network device 130 and/or server 140 using connections associated with a primary data network, such as network 120. Alternatively, client 110 may communicate with network device 130 and/or server 140 using a dedicated network and/or link. A link may be a dedicated physical or virtual link and may include encryption protocols, such as data unit encapsulation, for protecting the content of communications between client 110 and a destination device, such as network device 130 and/or server 140.

Exemplary Functional Diagram

Figure 2:
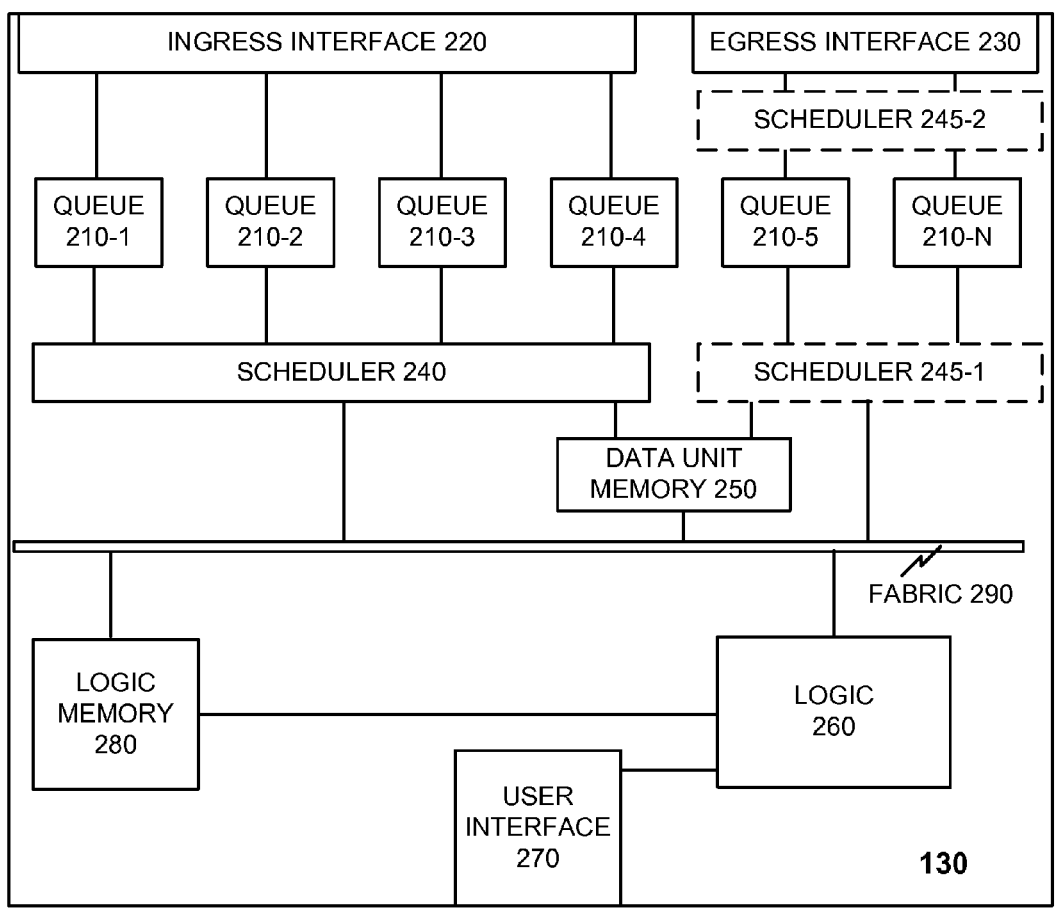
FIG. 2 illustrates an exemplary functional block diagram showing an implementation for scheduling data units in a network device according to an implementation consistent with the principles of the invention.

FIG. 2 illustrates an exemplary functional block diagram showing an implementation for scheduling packets in network device 130 according to an implementation consistent with the principles of the invention. The functional diagram of FIG. 2 may include queues 210-1 to 210-N (hereinafter collectively queue(s) 210), ingress interface 220, egress interface 230, scheduler 240, scheduler 245-1 and 245-2, data unit memory 250, logic 260, user interface 270, logic memory 280, and fabric 290.

Queue 210 may include a device capable of holding data unit information that is received from, or transmitted to, ingress interface 220, egress interface 230, data unit memory 250, logic 260, and/or logic memory 280. For example, queues 210-1 to 210-4 may operate as buffers that receive data unit information from ingress interface 220. Queues 210-1 to 210-4 may store received data unit information until the data unit information is sent to another device, such as data unit memory 250. Logic 260 may operate on received data units and/or received data unit information to produce processed data units and/or processed data unit information. A processed data unit may be a data unit that has had an operation performed thereon and processed data unit information may include information about processed data units. For example, processing a data unit may include manipulating information included in the data unit, formatting the data unit, and/or encapsulating the data unit. Information about processed data units may be provided to other queues, such as queues 210-5 to 210-N. Queues 210-5 to 210-N may send processed data unit information to egress interface 230 so that the processed data unit information can be sent to a destination device, such as server 140, client 110, or a downstream device.

Queues 210 may be configured to operate with data unit information that represents data units having certain forms, such as packets, cells, etc. Queues 210 and/or data unit information associated with queues 210 can also be identified and/or segregated based on characteristics of queues 210 and/or the data units, such as queue and/or data unit priorities (such as high, medium, or low), types of traffic (such as voice, video, data, and control), colors of data units (such as red, yellow, and green), etc. A scheduler, such as scheduler 240, may take into account information in queue 210 when operating on data unit information consistent with the principles of the invention.

Ingress interface 220 and egress interface 230 may, respectively, include a device configured to receive and/or send data units. Interfaces 220/230 may include any receiver, transmitter, and/or transceiver-like mechanism that enables network device 130 to communicate with other devices and/or systems. For example, interfaces 220/230 may include a modem, an Ethernet interface to a LAN, a wireless transceiver for coupling a wireless network device 130 to network 120, client 110, an input/output interface associated with server 140, an input/output interface associated with network 120, etc.

Scheduler 240 may include a device or logic that uses data unit information to schedule data units to account for a downstream stage or device in network device 130 and/or another device in network 100. For example, scheduler 240 may be implemented via hardware and/or software. Scheduler 240 may operate on data unit information, such as a data unit description and/or a reference to a data unit. For example, implementations of scheduler 240 may operate using data unit size information, data unit priority information, data unit color information, data unit conversion information (e.g., packet to cell), destination information, source information, and/or other types of information related to data units passing through network device 130 consistent with the principles of the invention.

Scheduler 240 may operate to schedule data units in a manner that takes into account the operation of other devices in a network, such as network 100. For example, scheduler 240 may take into account a characteristic, such as a parameter and/or transformation function, of one or more downstream devices operating in network 100 or network device 130. Assume that scheduler 240 may use data unit information to schedule data units at a first node in a way that takes into account a bandwidth and/or processing parameter associated with a second node that may be downstream from the first node. The first node and second node may be operating within scheduler 240 on network device 130 and/or may be associated with other devices external to network device 130. "Downstream," as used herein, refers to a direction in which data units are flowing. For example, if a first node receives packet information at a first interface and sends the packet information out a second interface, the first interface may be referred to as facing upstream while the second interface may be referred to as facing downstream.

Scheduler 240 may operate anywhere that congestion may occur, such as with interfaces on network device 130. For example, an implementation of scheduler 240 may be associated with an input interface, such as ingress interface 220.

Network device 130 may include other scheduler implementations, such as scheduler 245-1 or 245-2, that may be configured in a manner similar to scheduler 240. Scheduler 245-1 and 245-2 may be associated with other devices and/or interfaces, such as egress queues 210-5 to 210-N and/or egress interface 230. Schedulers 245-1 and 245-2 may operate prior to an egress queue, such as queues 210-5 to 210-N, (e.g., scheduler 245-1) or after an egress queue 210-5 to 210-N (e.g., scheduler 245-2).

Implementations of network device 130 may operate with a single scheduler 240 and/or with multiple schedulers, such as scheduler 240, 245-1 and 245-2. Implementations operating with multiple schedulers 240/245-1/245-2 may configure the schedulers in a hierarchy that can be flat or layered. Network device 130 may operate with multiple schedulers 240/245-1/245-2 that reside on network device 130 or that are distributed across multiple devices, such as server 140 or client 110, without departing from the spirit of the invention.

Data unit memory 250 may include logic configured to store data units and/or data unit information. Data unit memory 250 may store incoming data units, incoming data unit information, processed data units, and/or processed data unit information. For example, data unit memory 250 may receive incoming data unit information from queue 210-1 and may make the information available to scheduler 240. Scheduler 240 may operate on the data unit information and may make processed data unit information available data unit memory 250.

Logic 260 may include any type of processor, microprocessor, and/or processing logic that may interpret and execute instructions. Logic 260 may be implemented in a standalone or distributed configuration, such as in a parallel processor configuration. Implementations of logic 260 may be hardwired logic, such as application specific integrated circuits (ASICs), field programmable gate arrays (FPGAs), etc. based on configurations of network device 130. Logic 260 may operate to control the operation of queues 210, interfaces 220/230, scheduler 240, schedulers 245-1/245-2, data unit memory 250, user interface 270, and/or logic memory 280. For example, logic 260 may instruct scheduler 240 to process data unit information at a first node in the scheduler using information (such as a transformation function) received from a second node.

User interface 270 may include one or more interfaces, components, or mechanisms that permit a user to input information to network device 130. User interface 270 may include a keyboard, a mouse, a pen, voice recognition and/or biometric mechanisms, etc. User interface 270 may also include one or more mechanisms that output information to, for example, a user. For example, user interface 270 may include a display, a printer, one or more speakers, etc. Implementations of user interface 270 may allow a user to configure the operation of scheduler 240 using packets/sec, cells/sec, bytes/sec, etc. Moreover, user interface 270 may allow a user to identify nodes operating in scheduler 240/245-1/245-2 and/or may allow the user to specify node inheritance characteristics, such as allowing one node to inherit a transformation function from another node.

Logic memory 280 may include a static and/or dynamic storage device that may store information, instructions, tables, and/or temporary state values for execution by logic 260 and/or for use by other devices operating in network device 130. Logic memory 280 may store temporary variables or other intermediate information during execution of instructions by logic 260.

Fabric 290 may include a device that permits communication among the components of network device 130.

Exemplary Scheduler

Figure 3:
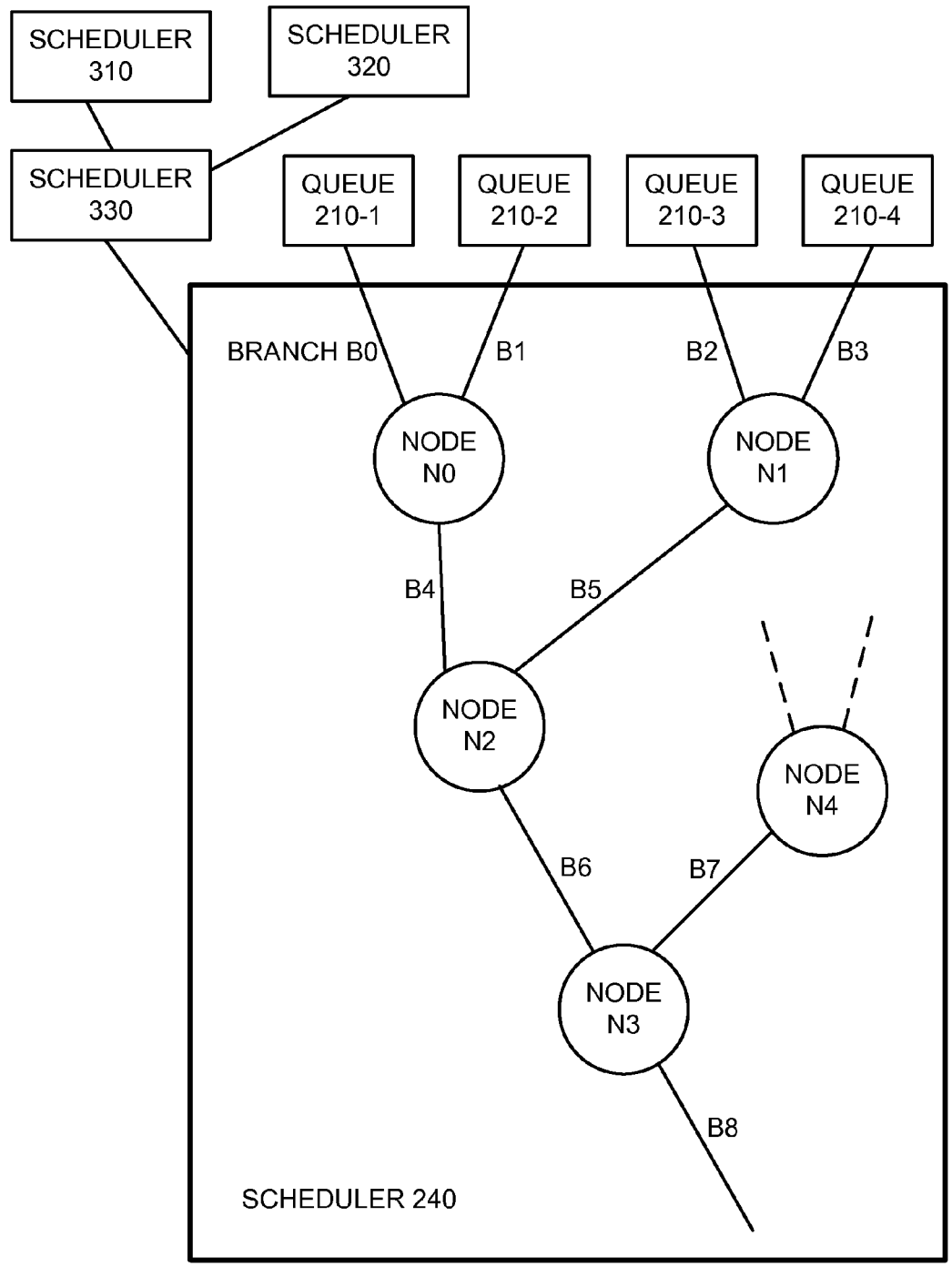
FIG. 3 illustrates an exemplary functional diagram showing an implementation of a scheduler illustrated in the network device of FIG. 2 according to an implementation consistent with the principles of the invention.

FIG. 3 illustrates an exemplary functional diagram showing an implementation of a scheduler illustrated in network device 130 according to an implementation consistent with the principles of the invention. Scheduler 240 is used in connection with FIGS. 3-6; however, the described implementations are not limited thereto. For example, schedulers 245-1 and/or 245-2 may be used in place of, or in combination with, scheduler 240.

The implementation of scheduler 240 shown in FIG. 3 may include nodes n0 to n4 and branches b0 to b8. Scheduler 240 may also operate with schedulers 310, 320 and 330 in a hierarchy. A scheduler hierarchy may be flat (i.e., all schedulers operating at the same level in the hierarchy) and/or layered (e.g., schedulers 310 and 320 operating at one hierarchy level and scheduler 330 operating at another level). Schedulers 310, 320, 330 may be similar in configuration to scheduler 240 described in connection with FIG. 2 and FIG. 3.

Nodes n0 to n4 may include any device that operates to aggregate two or more flows. An aggregated flow occurs when two or more flows, such as flows traversing branches b0 and b1, terminate at a device, such as node n0 and leave the device via a single path, such as branch b4. Flows may include data unit information that represents data units having substantially any form, such as packet, cell, etc., and/or substantially any size. Nodes n0 to n4 may operate on data unit information associated with incoming traffic flows to network device 130. For example, in one implementation, a node may receive packet information and may convert the packet information to a cell information. Nodes n0 to n4 may be arranged in a hierarchy within scheduler 240. In addition, nodes operating within one scheduler may be configured to communicate with nodes operating within another scheduler and/or to communicate with other devices in network 100 consistent with the principles of the invention.

Implementations of scheduler 240 may operate with nodes having an arrangement with respect to each other. For example, from a perspective of node n2, node n0 and node n1 are upstream nodes. Again from a perspective of node n2, nodes n3 and n4 are downstream nodes. With respect to FIG. 3, data unit information flows from the top of the figure to the bottom. In other implementations of network device 130 and/or scheduler 240, traffic can flow in other directions.

Scheduler 240 may use accounting techniques to facilitate the operation of nodes operating within scheduler 240. For example, scheduler 240 may use an arrangement of credits and/or debits to facilitate passage of data unit information through a node. Assume that node n2 is allocated a number of rate credits at a periodic interval. Further assume that node n2 can receive rate credits up to a determined limit. Node n2 may be debited a number of credits when node n2 sends data unit information to a downstream node or device. For example, the number of credits debited from node n2 may be related to the size of an outgoing data unit. Node n2 may be allowed to send processed data unit information to a downstream node or device when node n2 has enough credits to cover the size of an outgoing data unit associated with the processed data unit information. If node n2 does not have sufficient credits to cover information associated with an outgoing data unit, the outgoing data unit may be dropped by network device 130. Implementations of scheduler 240 may also operate with other credit/debit techniques, such as weight based credits. Weight based credits may be allocated to nodes according to a programmed weight when a node, or nodes, have exhausted a supply of credits. Weight based credits may operate to supply depleted nodes with credits.

Branches b0 to b8 may include a device or structure for coupling one node to another. For example, a branch may include a physical connection, such as a wire or optical fiber.

Exemplary Node Configuration

Figure 4:
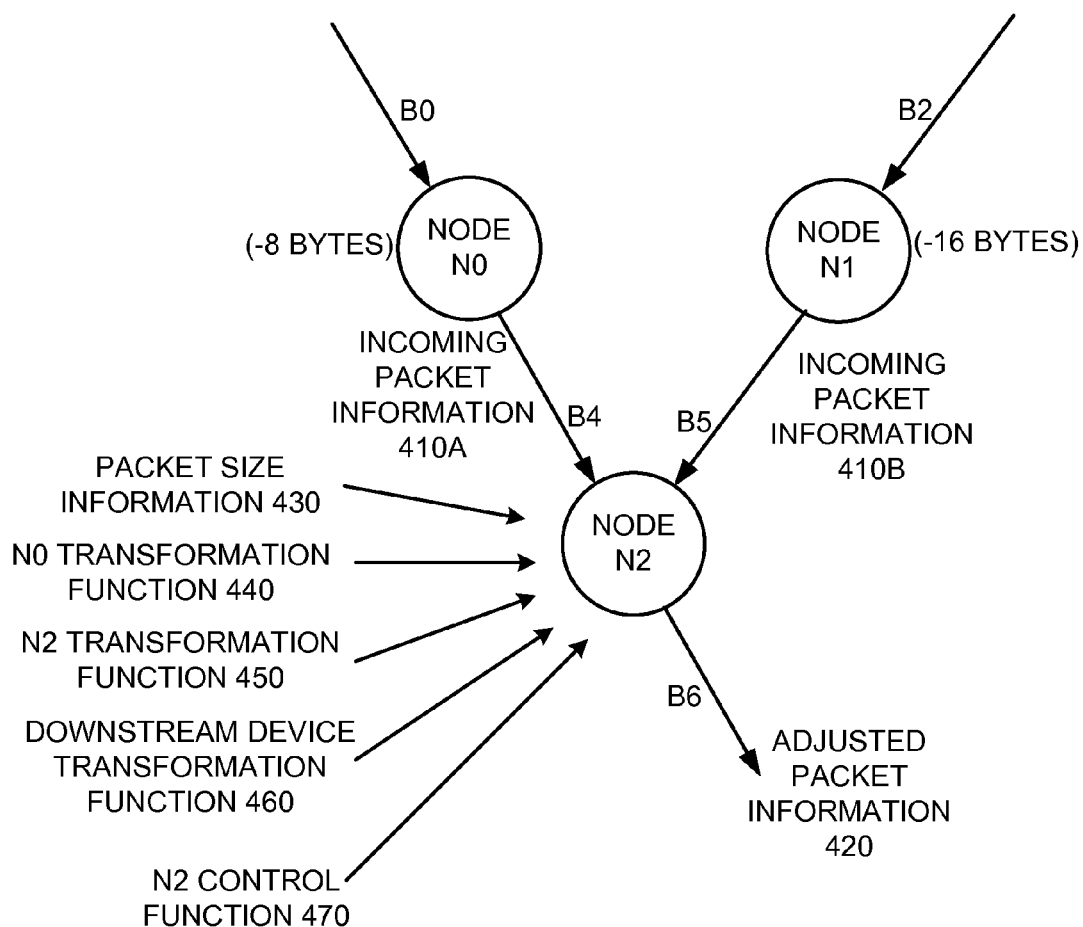
FIG. 4 illustrates an exemplary implementation of a node used in the scheduler of FIG. 3 along with exemplary transformation functions and parameters that can be used by the node when operating on data unit information consistent with the principles of the invention.

FIG. 4 illustrates an exemplary implementation of a node used in the scheduler of FIG. 3 along with exemplary transformation functions and parameters that can be used by the node when operating on data unit information consistent with the principles of the invention. Node n2 may operate on data unit information received from upstream nodes, such as nodes n0 or n1. Implementations of node n2, and other nodes operating in scheduler 240, may receive data unit information from other devices, such as other nodes. For example, node n2 may receive packet size information 430, node n0 transformation function 440, node n2 transformation function 450, downstream device transformation function 460 and/or node n2 control function 470.

Incoming packet information 410A and/or 410B may refer to a data unit information that is received by a node, such as node n2. Adjusted packet information 420 may refer to processed data unit information, i.e., information that is processed using a node, such as node n2. Adjusted packet information 420 may differ from an incoming packet information 410A/410B. For example, adjusted packet information 420 may be larger or smaller in size than incoming packet information 410A/410B. Moreover, adjusted packet information 420 may have a format that differs from a format of incoming packet information 410A/410B. For example, incoming packet information 410A can be associated with a first data unit type, such as a packet, and adjusted packet information 420 can be associated with a second data unit type, such as a cell.

Packet size information 430 may include information that identifies a size of a data unit entering node n2. Packet size information 430 may be represented in substantially any units, such as bits, bytes, buffers, blocks, cells, etc.

Node n0 transformation function 440 and node n2 transformation function 450 may include information associated with parameters, equations, variables, and/or constants used by node n0/n2 to process data unit information received by node n0/n2. "Transformation function," as used herein, refers to any function, variable, constant, value, or technique that can be used to represent an operating parameter associated with a device, such as a node operating in a scheduler, such as scheduler 240. Transformation functions may include parameters used by nodes to perform operations on incoming and/or outgoing data unit information, such as operations associated with accounting for packet to cell transformations. Node n0/n2 may use one or more transformation functions to operate on incoming and/or outgoing data units.

Node transformation functions may include inherited transformation functions and/or native transformation functions. "Inherited transformation functions" may refer to transformation functions received directly and/or indirectly from another node or device. In contrast, "native transformation function" refers to a transformation function that is associated with the particular node (i.e. a transformation function that is not inherited from another device). For example, node n2 may inherit n0 transformation function 440 from node n0. Node n2 may also inherit transformation functions from other upstream nodes, downstream nodes, and/or devices operating in network device 130 and/or in network 100. A native transformation function may include a transformation function that is hardwired and/or programmed into a node in which the transformation function will operate.

Downstream device transformation function 460 may include a transformation function that is associated with a device operating downstream from a node, such as node n2. Downstream device transformation function 460 may be associated with a characteristic of a downstream device, such as an operating speed and/or operational protocol of the downstream device, formatting operations performed on data units by the downstream device, and/or configuration information associated with the downstream device (e.g., a number of ports or queues operating on the downstream device).

Downstream device transformation function 460 may be passed directly to node n2 from a downstream device, such as node n3, via, for example, a feedback path. In one implementation, a downstream device may use a protocol, such as a control protocol, to communicate downstream device transformation function 460 to node n2. Downstream device transformation function 460 may also be passed to node n2 via another device on behalf of the downstream device. In still other implementations, downstream device transformation function 460 may be programmed into node n2.

Node n2 control function 470 may include information that causes node n2 to select transformation functions, parameters, and/or other information to use when operating on data unit information. For example, node n2 control function 470 may cause node n2 to use n0 transformation function 440 when data unit information is received from node n0.

Nodes n0, n1 and n2 may represent devices operating in a network. For example, nodes n0 and n1 may represent network devices, servers, or other devices that may provide traffic to another device in a network. Assume that nodes n0 and n1 represent devices that provide encapsulated traffic to another device that is represented by node n2. Nodes n0 and n1 may account for encapsulated traffic used by a device represented by node n2 via an upstream link, such as a tunnel. The device represented by node n2 may terminate the upstream link (e.g., terminating the tunnel). The device represented by node n2 may send traffic, such as un-encapsulated traffic, to a downstream device via a downstream link. If the downstream link has a traffic rate associated therewith, traffic passing through devices represented by nodes n0 and n1 can be configured so as to account for the downstream traffic rate (i.e., the un-encapsulated traffic rate) when passing encapsulated traffic to a device represented by node n2.

For example, a device represented by node n2 may have a rate of 1 Mbit/sec at its output. In order to maintain 1 Mbit/sec when encapsulation is removed from incoming data units received from devices represented by nodes n0 or n1, the device represented by node n2 may allow more than 1 Mbit/sec to enter. For example, a transformation function for a device represented by node n0 may use 8 bytes to encapsulate a data unit. Node n2 may inherit node n0 transformation function 440 and may allow 1 Mbit/sec+8 bytes/packet to enter node n2 so that 1 Mbit/sec exits node n2 after node n0 encapsulation is removed. In contrast, if a device represented by node n1 uses 16 bytes to encapsulate a data unit, node n2 may allow 1 Mbit/sec+16 bytes/packet to enter node n2 so that 1 Mbit/sec exits node n2 after node n1 encapsulation is removed. Node n2 may inherit a transformation function associated with node n0 prior to making the 8 byte correction to data unit information received via branch b4 and may inherit a transformation function associated with node n1 prior to making the 16 byte correction to data unit information received via branch b5.

Implementations consistent with the principles of the invention, may allow node n2 to inherit transformation functions from upstream nodes, such as node n0 or n1, so that node n2 can account for processing operations performed by upstream devices. Nodes may also inherit multiple transformation functions, such as transformation functions from two or more nodes, such as two or more upstream nodes associated with a traffic flow received at a node. For example, referring to FIG. 3, node n3 may be able to inherit transformation functions from nodes n0, n1, and/or n2 for traffic received via branch b6. Nodes may also inherit transformation functions from downstream nodes and/or devices. For example, node n2 may inherit transformation functions from downstream devices, such as nodes n3 or n4 consistent with the principles of the invention.

Exemplary Data Structure

FIG. 5 illustrates an exemplary data structure that can be used to store information associated with node n2 according to an implementation consistent with the principles of the invention. Information used by nodes may be stored in machine-readable formats, such as data structure 500 within data unit memory 250. Data structure 500 may include node identifier field 510, node n2 transformation function field 520, node n2 control function field 530, upstream node functions field 540, downstream node functions field 550, scheduler parameters field 560, and other parameters field 570.

Node identifier field 510 may include information used to identify a node to which data structure 500 pertains. Node n2 transformation function field 520 includes information associated with node 2 transformation function 450. Node n2 control function field 530 includes information associated with node n2 control function 470.

Upstream node functions field 540 includes information associated with upstream node transformation functions. For example, upstream node functions field 540 may include information associated with node n0 transformation function 440, a node n1 transformation function, and transformation functions associated with other nodes located upstream with respect to node n2.

Downstream node functions field 550 includes information associated with downstream node transformation functions, such as a transformation function associated with node n3. Scheduler parameters field 560 may include information associated with schedulers 240/310-330 that operate directly or indirectly with a node identified in node identifier field 510. Other parameters field 570 may include parameters associated with other devices operating with a node identified in node identifier field 510. For example, other parameters field 570 may include information associated with branches b4, b5, or b6 and/or other devices operating in network device 130 or network 100.

Data structure 500 may be configured so as to present information in a manner that can be processed by logic operating on network device 130 and/or that can be interpreted by an operator of network device 130.

Exemplary Method

Figure 6:
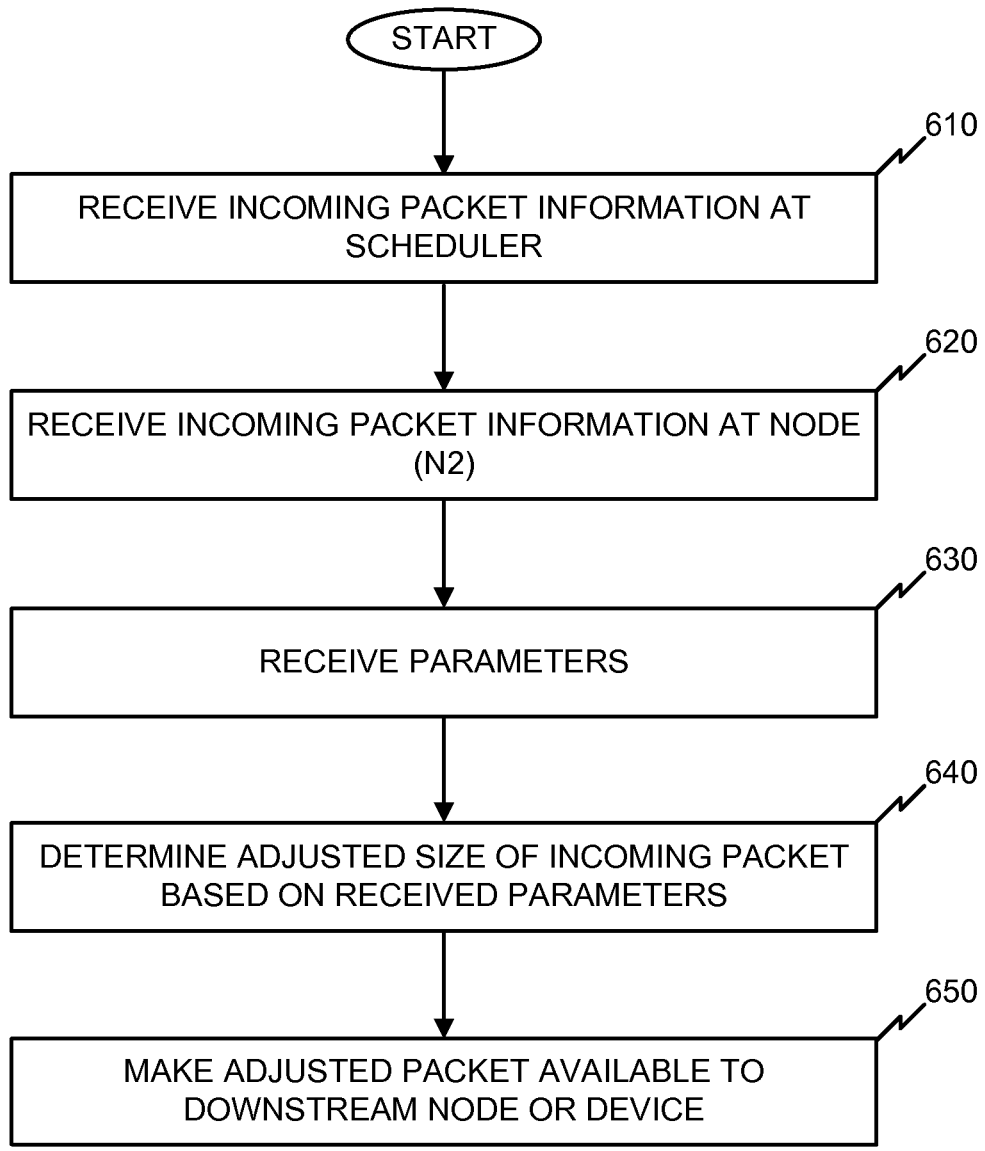
FIG. 6 illustrates an exemplary method for scheduling packets according to the exemplary implementation consistent with the principles of the invention.

FIG. 6 illustrates an exemplary method for scheduling data units according to an exemplary implementation consistent with the principles of the invention. The method of FIG. 6 will be described from a perspective of node n2 for clarity; however, the illustrated and described method is not limited to node n2. Moreover, the method of FIG. 6 is discussed in connection with "packets." Packet, as used in connection with FIG. 6, is representative of a type of data unit that can be used with an implementation of the invention. Implementations, such as those discussed in connection with FIG. 6, may also operate on other types of data units, such as cells, consistent with the principles of the invention.

Information associated with an incoming packet may be received at scheduler 240 (act 610). For example, ingress interface 220 may receive a packet over network 100. Ingress interface 220 may provide information about the incoming packet to a queue, such as queue 210-1. Queue 210-1 may send the packet information to data unit memory 250. Data unit memory 250 may provide the packet information to scheduler 240. For example, data unit memory 250 may provide scheduler 240 with information about packet priority, packet color, packet size, and/or packet destinations consistent with the principles of the invention.

Scheduler 240 may be implemented as a hierarchical scheduler having a number of nodes, such as nodes n0 to n4 (FIG. 3), operating therein. Nodes n0 to n4 may be arranged in a hierarchy, such as a flat hierarchy and/or a layered hierarchy. Nodes n0 to n4 may represent devices operating in network 100 and/or may represent devices operating within a single device in network 100, such as network device 130, server 140, or client 110.

Scheduler 240 may send the incoming packet information to a node, such as node n0, from a queue, such as queue 210-1. Node n0 may operate on the incoming packet information or may pass the incoming packet information on to another node, such as node n2, without performing processing thereon. For example, node n0 may send incoming packet information to node n2 as, incoming packet information 410A.

Node n2 may receive incoming packet information 410A via a branch, such as branch b4 (act 620). Node n0 and node n2 may operate in the same device and/or may operate on separate devices. For example, in one implementation, node n0 may operate on a first card installed in network device 130 and node n2 may operate on a second card installed in network device 130.

Node n2 may receive parameters that can be used to operate on incoming packet information 410A (act 630). For example, node n2 may receive parameters via data structure 500 residing in data unit memory 250 and/or logic memory 280. Node n2 may use its own transformation function (node n2 transformation function 450), node n0 transformation function 440 and/or a downstream device transformation function 460 to process incoming packet information 410A. For example, node n2 may inherit node n0 transformation function 440 from node n0 and/or another node on behalf of node n0.

Node n2 may use received parameters to process incoming packet information 410A to produce processed packet information, such as adjusted packet information 420. For example, node n2 may account for processing performed by upstream nodes and/or downstream nodes or devices when operating on incoming packet information 410A. In one implementation, node n2 may inherit a transformation function associated with another node, such as node n0. By inheriting a transformation function, such as node n0 transformation function 440, node n2 may account for data added and/or subtracted by node n0 with respect to incoming packet information 410A. For example, if node n0 adds a number of bytes to incoming packet information 410A, such as by encapsulating incoming packet information 410A for use in a tunneling application, it may be desirable to have node n2 account for those bytes without padding and/or unpadding incoming packet information 410A.

Node n2 may adjust its output rate and/or may adjust the size associated with incoming packet information 410A based on received parameters, such as an inherited node n0 transformation function 440 (act 640). Assume that node n0 accounts for the addition of 12 bytes to each incoming packet that is represented by incoming packet information 410A, where the 12 bytes operate to encapsulate the incoming packet. Node n2 may inherit node n0 transformation function 440 and may account for the 12 bytes when operating on incoming packet information 410A. For example, assume that node n2 represents a device that will send data to a downstream device that removes encapsulation before transmitting un-encapsulated traffic to a link at a rate of 1 Gigabit per second (Gbit/sec). Node n2 may use node n0 transformation function 440 and may account for the 12 byte encapsulation by accounting for 1 Gbit/sec+12 bytes/packet going to the downstream device. Node n2 may send adjusted packet information 420 to a downstream node (act 650).

A downstream device may receive 1 Gbit/sec+12 bytes/packet from a device represented by node n2 via a traffic flow that includes a number of adjusted packets. When the downstream device de-encapsulates the adjusted packets, 1 Gbit/sec can be sent to a device, or devices, serviced by the downstream device. For example, the downstream device may send 1 Gbit/sec to a number of subscribers.

Implementations of scheduler 240 may be configured to facilitate regulation of nodes operating therein using flow control techniques, such as credits and/or debits. For example, node n2 may receive a number of credits based on parameters associated with network device 130, such as according to a rate and/or weight. Node n2 may use the credits to cover sizes of adjusted packets represented by adjusted packet information 420 leaving node n2. When node n2 sends adjusted packet information 420 to a downstream node in act 650, node n2 may be debited a number of credits based on the size of an adjusted packet that is represented by adjusted packet information 420. Scheduler 240 may use credits and/or debits to help regulate the flow of packet information through nodes operating in scheduler 240.

Implementations of the invention can operate to account for information associated with a configuration of data units passing through scheduler 240 consistent with the principles of the invention. For example, scheduler 240 may be configured to account for packet to cell transformations as described below.

Nodes n0 to n4 may account for packet to cell transformations alone or in combination with each other. For example, a packet to cell transformation expression that can be used by nodes when accounting for packet to cell transformations in network device 130 may be represented as:

$$\max(\text{incoming packet size}, \text{minimum packet value}) \pm \text{fixed amount} = X \quad (\text{EQ. 1})$$

$$X/(\text{number of bytes per cell size}) = \text{number of cells} \quad (\text{EQ. 2})$$

The above expressions may be repeated on information associated with each incoming packet. The results of operations performed on behalf of subsequent incoming packets may be added to the results of operations performed on behalf of previous incoming packets, as described in the following example.

Assume that incoming packet information 410A represents a packet having a size of 60 bytes and that a node has a minimum packet value of 100 bytes. The minimum packet value may be selected so as to represent that node n2 receives a certain minimum amount of traffic. Further assume that node n2 has a fixed amount in EQ. 1 of four bytes. A fixed value may be specified to account for operational parameters, such as packet encapsulation. Further assume that the number of bytes per cell size is 48 (i.e., there are 48 bytes to a cell).

Using the above information, EQ. 1 may be represented as:

$$\max(60,100)+4=X$$

The maximum of (60, 100) is 100. Therefore, X=104 (resulting from 100+4).

A number of cells can be computed from incoming packet information 410A using EQ. 2 as follows:

104/48=2 cells and a remainder of 8 bytes, which is rounded up to 3 cells.

The above operations may be performed on subsequent incoming packet information 410A to produce a total of 5 cells (2 cells+2cells and 8 bytes+8 bytes). The above operations can be performed on information associated with additional incoming packets and the results repeatedly added. Assume that incoming traffic includes a total of six packets. These six packets would result in 13 cells (6 packets×2 cells per packet plus 8 byte remainder per packet×6 packets=13 cells).

Implementations that account for packet to cell transformations in scheduler 240 may allow a user to specify a rate in cells/second. Allowing users to specify rates in cells/second may be beneficial in applications where devices in network 100 operate with cells. For example, a downstream device may operate via cells/sec. A user of network device 130 may wish to configure scheduler 240 in cells/sec so as to obtain a desired cell/second rate. Implementations of scheduler 240 may allow nodes n0 to n4 to inherit packet to cell transformation functions from other nodes and/or devices consistent with the principles of the invention.

Packet to cell transformations may be accounted for on a per node and/or per queue basis using implementations consistent with the principles of the invention. Allowing per node and/or per queue configurations may facilitate configuring scheduler 240 for substantially any type of traffic and or network configuration.

CONCLUSION

Systems and methods consistent with the principles of the invention provide techniques for processing data unit information in a scheduler, such as a hierarchical packet scheduler. The disclosed techniques may allow nodes operating in a scheduler to inherit transformation functions and/or characteristics from other nodes and/or devices. The inherited transformation functions and/or other characteristics may allow a node to account for other nodes and/or devices operating on the data units.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIG. 6 the order of the acts may be varied in other implementations consistent with the present invention. Moreover, non-dependent acts may be implemented in parallel.

Also, network and system implementations have been illustrated and described using a single network device, server, client and network. However, in other implementations, networks and systems may include multiple devices and may further include additional devices, such as routers, intrusion detection systems (IDSs), service gateways, proxy servers, and the like. In addition, devices, such as firewalls, may employ multiple interfaces or ports for receiving and sending data units and/or may include multiple schedulers.

While exemplary implementations have been described herein, the processing performed by one of the devices described above may be performed by another device. For example, the processing performed by network device 130 and server 140 may be performed by a single device in alternative implementations. Therefore, implementations consistent with the principles of the invention are not necessarily limited to a particular configuration.

Moreover, it will be apparent to one of ordinary skill in the art that aspects of the invention, as described above, may be implemented in many different forms of software, firmware, and hardware in the implementations illustrated in the figures. The actual software code, or specialized control hardware, used to implement aspects consistent with the principles of the invention is not limiting of the present invention. Thus, the operation and behavior of the aspects were described without reference to the specific software code, it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit, a field programmable gate array or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A non-transitory storage device storing instructions, the instructions comprising:
one or more instructions which, when executed by at least one processor of a first device, cause the at least one processor to receive data unit information associated with a data unit,
the data unit information being received from a second device;
one or more instructions which, when executed by the at least one processor, cause the at least one processor to receive information associated with the second device,
the information associated with the second device being received from a third device,
the third device being different than the second device,
the information associated with the second device including:
information identifying a modification, performed by the second device, of one or more data units;
one or more instructions which, when executed by the at least one processor, cause the at least one processor to modify the data unit information to obtain modified data unit information,
the data unit information being modified based on:
the information identifying the modification of the one or more data units, and
information identifying a size associated with the data unit information,
the one or more instructions to modify the data unit information to obtain the modified data unit information including:
one or more instructions to modify the size associated with the data unit information, to obtain the modified data unit information, based on the information identifying the modification; and one or more instructions which, when executed by the at least one processor, cause the at least one processor to send the modified data unit information.

2. The non-transitory storage device of claim 1, where the instructions further comprise:
one or more instructions to store information associated with a plurality of devices,
where the information associated with the plurality of devices includes the information associated with the second device.

3. The non-transitory storage device of claim 1, where the one or more instructions to send the modified data unit information include:
one or more instructions to send, to a fourth device, the modified data unit information,
the fourth device being different than the first device, the second device, and the third device.

4. The non-transitory storage device of claim 1, where the data unit information is associated with a first type of data unit, and
where the modified data unit information is associated with a second type of data unit that is different than the first type of data unit.

5. The non-transitory storage device of claim 1, where the modified data unit information is sent based on:
a first value indicating whether the first device is allowed to send information associated with data units, and
a second value associated with the first device sending the modified data unit information,
the modified data unit information being sent when the first value exceeds the second value.

6. A method comprising:
receiving, by a first device and from a second device, packet information associated with a packet;
receiving, by the first device and from a third device, information that is associated with the second device,
the second device being different than the third device, and
the information that is associated with the second device including:
information identifying modifications, performed by the second device, on one or more data units;
modifying, by the first device, the packet information to obtain modified packet information,
modifying the packet information including:
modifying a packet size associated with the packet information, to obtain the modified packet information, based on the information identifying the modifications; and
sending, by the first device, the modified packet information.

7. The method of claim 6, where sending the modified packet information includes sending the modified packet information based on:
a first value indicating that the first device is allowed to send information associated with packets, and
a second value associated with the first device sending the modified packet information.

8. The method of claim 7, where sending the modified packet information further includes sending the modified packet information based on the first value exceeding the second value.

9. The method of claim 6, where sending the modified packet information includes sending the modified packet information to a fourth device.

10. The method of claim 6, where receiving the information that is associated with the second device includes receiving information associated with a plurality of devices,
where the information associated with the plurality of devices includes the information that is associated with the second device, and
where the packet information is associated with the second device,
the method further comprising:
selecting the information that is associated with the second device, from the information associated with the plurality of devices, based on the packet information being associated with the second device.

11. The method of claim 6, where the packet information is associated with a first format, and
where the modified packet information is associated with a second format,
the second format being different than the first format.

12. The method of claim 6, where modifying the packet information includes modifying the packet information further based on a value that is determined from the information that is associated with the second device.

13. The method of claim 12, where modifying the packet information further includes:
selecting a larger one of the packet size or a minimum packet size that is associated with an amount of traffic received by the first device; and
selectively:
adding the value to the selected larger one of the packet size or the minimum packet size to obtain a first packet size; or
subtracting the value from the selected larger one of the packet size or the minimum packet size to obtain a second packet size,
where the modified packet information is based on one of the first packet size or the second packet size.

14. A device comprising:
a memory to store one or more instructions; and
a processor to execute the one or more instructions to:
receive, from a first other device, data unit information associated with a data unit;
receive, from a second other device, information that is associated with a third other device,
the first other device being different than the second other device,
the information that is associated with the third other device including:
information identifying a modification of one or more data units performed by the third other device;
modify the data unit information to obtain modified data unit information,
the data unit information being modified based on:
the information identifying the modification performed by the third other device, and
information identifying a size associated with the data unit information,
when modifying the data unit information, the processor is to:
modify the size associated with the data unit information, to obtain the modified data unit information, based on the information identifying the modification performed by the third other device; and
send the modified data unit information.

15. The device of claim 14, where the data unit information is associated with a first type of data unit, and where, when modifying the data unit information, the processor is to modify the data unit information to obtain modified data unit information that is associated with a second type of data unit,
the second type of data unit being different than the first type of data unit.

16. The device of claim 15, where the first type of data unit includes a packet, and
where the second type of data unit includes a type of data unit that is different than a packet.

17. The device of claim 14, where the processor is to send the modified data unit information based on:
a first value indicating whether the device is allowed to send information associated with data units, and
a second value associated with the device,
the second value being based on the size associated with the modified data unit information.

18. The device of claim 17, where the processor is to send the modified data unit information based on the first value exceeding the second value, and
where the processor is further to:
subtract the second value from the first value to obtain a third value when the modified data unit information is sent, and
send data unit information associated with another data unit when the third value exceeds a fourth value that is associated with the device sending the data unit information associated with the other data unit.

19. The device of claim 14, where the processor is further to:
store information associated with a plurality of devices,
where the stored information associated with the plurality of devices includes the information associated with the third other device.

20. The device of claim 14 where, when sending the modified data unit information, the processor is to send the modified data unit to a fourth other device.

* * * * *